R. A. NEISZ.
AUDIBLE SPEED SIGNAL.
APPLICATION FILED OCT. 27, 1920.
1,371,048.
Patented Mar. 8, 1921.
2 SHEETS—SHEET 1.
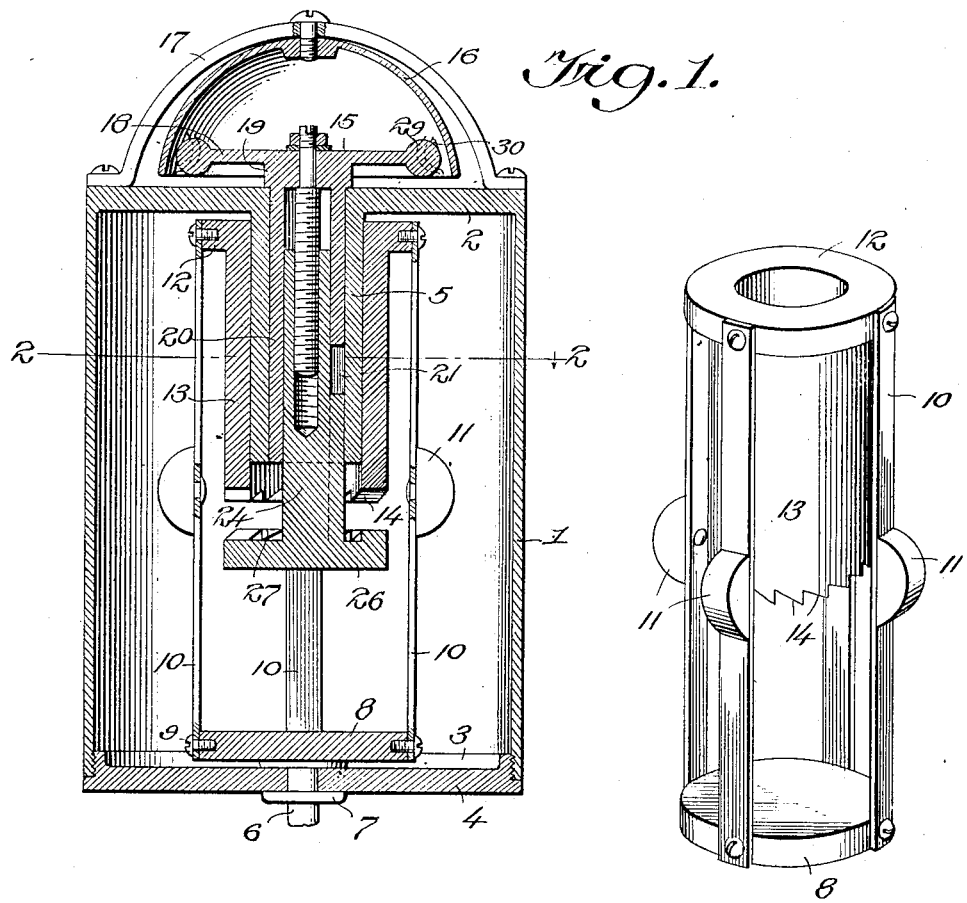
Fig. 1.
Fig. 3.
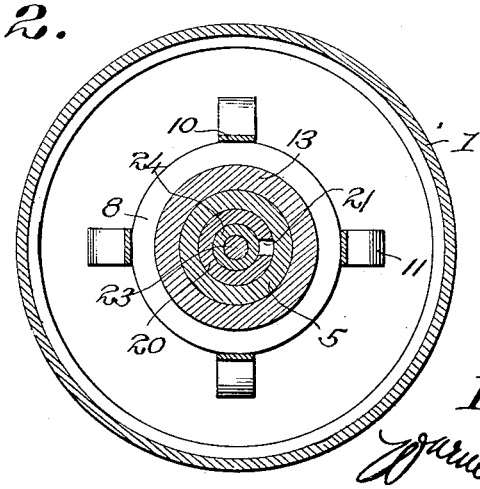
Fig. 2.
Inventor
R. A. Neisz, by
Warner J. Cubberley
Attorney

UNITED STATES PATENT OFFICE.

ROBERT A. NEISZ, OF RICHMOND, VIRGINIA.

AUDIBLE SPEED-SIGNAL.

1,371,048.   Specification of Letters Patent.   Patented Mar. 8, 1921.

Application filed October 27, 1920. Serial No. 419,977.

*To all whom it may concern:*

Be it known that I, ROBERT A. NEISZ, a citizen of the United States, residing at Richmond, in the county of Henrico and State of Virginia, have invented a new and useful Audible Speed-Signal, of which the following is a specification.

My invention relates generally to improvements in audible signaling devices, and more particularly it has reference to the provision of a governor controlled, adjustable audible signal for use upon power driven vehicles whereby an alarm will be given upon the attainment of a prescribed speed by the vehicle.

The present state of development of motor vehicles is such that an excessive speed may be attained by the vehicle before the driver becomes actually conscious of it. Furthermore, on thoroughfares where traffic is heavy the driver must of necessity keep his attention continually upon the road, and as a consequence the speed limit prescribed by law is often unintentionally exceeded. In order, therefore, that a driver of a vehicle may be effectively and positively informed the instant a predetermined speed is attained I have connected with one of the moving members of a vehicle, such as one of its wheels, an audible signal, as for instance a bell, which is constructed with a spring governor controlled clutch element adapted to be automatically thrown in to actuate the signal the instant a predetermined speed is reached. Furthermore, I have devised means for regulating the action of the clutch so that it may be adjusted to be automatically thrown in to actuate the signal at any one of a wide range of speeds.

From the foregoing it will be evident that the principal objects of my invention, briefly stated, are: first, to provide a positive and effective audible signal for use with power driven vehicles; second, to provide means for accurately and easily regulating the signal to respond upon the attainment of any one of a wide range of speeds; third, to provide means in the form of a spring governor for controlling the operation of the signal and effectively and automatically returning the signal to normal, or its inoperative state, immediately upon decrease of the speed of a vehicle below a predetermined rate; and fourth, to so construct the signal that it may be used with a stationary engine or other power plant, or in conjunction or connection with a speed indicator of the type commonly termed a "speedometer."

To these and other ends, my speed signal consists in the construction, arrangement and combination of parts described hereinafter, illustrated in the drawings, and pointed out in the claims forming a part of this specification.

One embodiment of my invention is represented by way of example in the accompanying drawings, wherein:—

Figure 1, is a sectional side elevation of my signal with the clutch element thrown out or in its passive position.

Fig. 2, is a section taken on the line 2—2 of Fig. 1.

Fig. 3, is a perspective view of the driving member of the clutch element.

Like characters of reference refer to like or similar parts throughout the several views of the drawings in which;—

Figure 4:
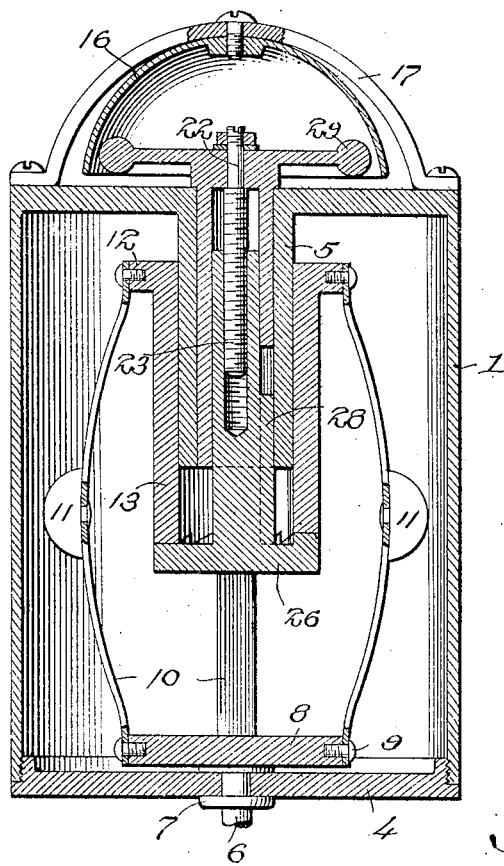
Fig. 4, is a sectional side elevation of my signal with the clutch element thrown in to actuate the signal.

The numeral (1) designates a cylindrical casing within which the operative parts of my invention are housed, and which is formed with a closed top (2) and an open bottom (3) normally closed by a screw-threaded cap (4). The top (2) of the casing is formed with a sleeve-like member (5) depending within the casing and extending to a point midway the top and the bottom of the casing. The cap (4) is provided with a central opening through which the terminal end of a short driving shaft (6) extends, and it is pointed out that any longitudinal movement of the shaft with respect to the cap is prevented by opposed stop-washers or flanges (7). Mounted upon the end of the shaft within the casing is a circular disk (8) and to the opposite end of the shaft is attached in any suitable manner a flexible connection (not shown) for transmitting movement from one of the vehicle wheels or its hub (not shown) to the disk (8), whereby the disk will be caused to revolve with a speed commensurate with the speed of the vehicle.

Attached by means of screws or the like (9) to the peripheral edge of the disk (8) are four or more diametrically opposed, vertically arranged spring members (10), carrying each a weight (11) midway its length, and secured at its upper end as by screws or the like to an annular flange (12) formed on a depending sleeve (13). The sleeve (13) embraces the sleeve (5) and rides freely upon the outer face thereof, and the end of the sleeve opposite the flange (12) is formed with teeth (14), the purpose of which will be hereinafter made clear. It is here pointed out that the disk (8), spring members (10), weights (11), sleeve (13) and teeth (14) form in assembly what has previously been referred to as the driving element of the clutch, and for the sake of brevity that term will hereinafter be used when referring to these parts as a unit.

Figure 5:
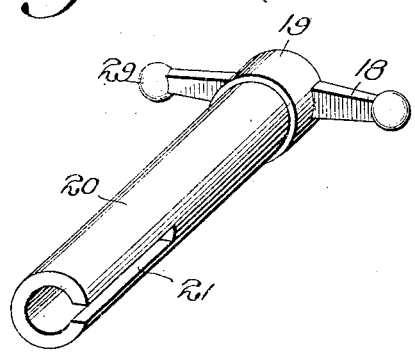
Fig. 5, is a detail perspective view of the bell clapper.
Figure 6:
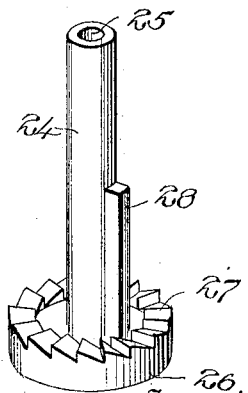
Fig. 6, is a detail perspective view of the driven member of the clutch element.

In the present instance there is mounted for rotation upon the top (2) of the casing (1) a bell clapper (15) which is adapted to contact with a bell (16) carried on an arched supporting frame (17) attached to the casing as shown; and the clapper (15) is formed with arms (18) extending from opposite sides of a hub (19), and each provided with a terminal knob or head (29) carrying a contact detent (30). Formed integrally with the hub (19) is a depending sleeve (20) of less diameter than the hub so that a shoulder is formed (see Fig. 5) for supporting the hub upon the top (2) of the casing. The sleeve (20) extends within the sleeve (5) and bears lightly against the inner wall thereof so that it may be freely rotated; and it is provided with a longitudinal slot (21) extending from a point midway its length to its free end. Carried within the sleeve (20) and disposed with its shank (22) extending through a central opening in the hub (19) is an elongated screw (23) the purpose of which will hereinafter appear. It will be noted that the shank of the screw is held in place by a square locked nut, and occasion is also taken at this place to point out that the so-called "Claxon" signal may very readily be substituted for the bell and clapper.

Arranged within the sleeve (20) is a shaft (24) which is provided with a longitudinal screw-threaded bore (25) for receiving the screw (23) so that by rotating the screw the position of the shaft may be adjusted with respect to the sleeve; and formed upon or rigidly attached to the end of the shaft is a disk (26) the upper face of which is formed with teeth (27). Disposed longitudinally of the shaft (24) and formed integrally therewith is a rib (28) which works in the slot (21) formed in the sleeve (20) in a manner similar to a key for preventing independent rotation of the shaft with respect to the sleeve while permitting of longitudinal adjustment of the same through the medium of the screw (23) as described heretofore. It is here pointed out that the shaft (24), disk (26), sleeve (20) and rib or key (28) form in assembly what has heretofore been termed the driven member of the clutch element, and the screw (23) is in its entirety the primary adjusting feature of the signal for regulating the operation of the clutch so that it will be thrown in at any one of a wide range of speeds.

In operation the disk (8) is rotated with a speed commensurate with the speed of rotation of one of the wheels or other moving part of a vehicle (not shown), and as a consequence the spring members (10) carrying the weights (11) function as a governor for moving the sleeve (13) upwardly or downwardly upon the sleeve (5) a predetermined distance to correspond broadly with a certain speed of rotation of a wheel of the vehicle. It is obvious therefore that as the speed of a vehicle is increased or decreased the sleeve (13) will be moved upwardly or downwardly upon the sleeve (5) through centrifugal force tending to bow the springs and their inherent resilience tending to return them to normal or a vertical position. Consequently when the sleeve (13) is moved downwardly a given distance the teeth (14) will mesh with the teeth (27) on the disk (26) and accordingly motion will be imparted through the driven member of the clutch element as a unit to the bell clapper (15), which in turn will contact with the bell and sound the alarm. As only a general adjustment of the device can be attained by increasing the size of the weights (11) or the resiliency of the springs (10), the screw adjustment before referred to is provided whereby minute adjustments may be effected by moving the shaft (24) to cause the teeth (27) to assume a normal position nearer or farther from the teeth (14).

It is especially pointed out that by attaching either the driving shaft (6) or the flexible connection (not shown) to the usual "speedometer" the two can be coupled to operate as a unit thus forming an exceptionally useful and practical device which combines and enhances the desirable features which each possess when operated separately.

Attention is also directed to the fact that the present signal may also be used with equal advantage upon or in conjunction with a stationary power plant, whereby to inform the attendant or engineer that the proper speed of the plant is being exceeded.

While in the foregoing, there has been illustrated and described such combination and arrangement of elements as constitute the preferred embodiment of my invention, it is nevertheless desired to emphasize the fact that interpretation of the invention should only be conclusive when made in the light of the subjoined claims.

Having described my invention and its objects with such attention to detail as will thoroughly acquaint one skilled in the art with its construction and advantages, I claim—

1. An audible signal comprising a clutch including driving and driven elements, means for moving the driving element into or out of engagement with the driven element, a rib formed on the driven element, a sleeve embracing the driven element and provided with a slot for receiving the rib whereby to cause the two to rotate as a unit, means associated with the sleeve for adjusting the driven element with respect to the sleeve and driving element, and means on the sleeve for producing an audible alarm.

2. An audible signal comprising a casing, a sleeve formed on and depending within the casing, a clutch carried within the casing and including driving and driven elements, the driving element of the clutch disposed to embrace and be supported by the sleeve on the casing, and the driven element of the clutch disposed to be embraced by and operable within the casing for the purpose set forth.

3. An audible signal comprising a clutch including driving and driven elements, means for moving the driving element into and out of engagement with the driven element, a sleeve embracing and rotatable with the driven element, a hub formed on the sleeve, a screw extending through the hub and engaging the driven element to adjust the same longitudinally with respect to the driving element, and means on the hub for engaging an audible signal to give an alarm when the clutch elements are moved into engagement with each other, for the purpose set forth.

In testimony whereof, I affix my signature hereto.

ROBERT A. NEISZ.